United States Patent [19]

Chiu et al.

[11] 4,329,181

[45] May 11, 1982

[54] METHOD FOR PREPARING ALKALINE CORRUGATING ADHESIVE

[75] Inventors: Chung-Wai Chiu, Westfield; Walter J. Krieg, Princeton, both of N.J.

[73] Assignee: National Starch and Chemical Corporation, Bridgewater, N.J.

[21] Appl. No.: 196,812

[22] Filed: Oct. 14, 1980

[51] Int. Cl.³ .......................... C08L 3/06; C08L 3/04; C09J 3/06
[52] U.S. Cl. .................................... 106/213; 106/210
[58] Field of Search ............................... 106/210, 213

[56] References Cited

U.S. PATENT DOCUMENTS

| | | | |
|---|---|---|---|
| 3,728,141 | 4/1973 | Ray-Chaudhuri et al. | 106/213 |
| 3,728,332 | 4/1973 | Tessler et al. | 106/213 |
| 3,732,207 | 5/1973 | Kovatz | 106/213 |
| 3,912,531 | 10/1975 | Musselman et al. | 106/213 |
| 3,944,428 | 3/1976 | Schoenberg et al. | 106/213 |
| 4,297,144 | 10/1981 | Klein et al. | 106/213 |

FOREIGN PATENT DOCUMENTS 54-72238  9/1979  Japan .
1514396  6/1978  United Kingdom .

OTHER PUBLICATIONS

Welling et al., "Viscosity Stabilizer for High Solid Thermal–Chemically Converted Starch Pastes Used as Coating Adhesives". TAPPI Coating Conference Preprint, 1975, pp. 53–59.

*Primary Examiner*—Allan Lieberman
*Attorney, Agent, or Firm*—Edwin M. Szala; Margaret B. Kelley

[57] ABSTRACT

A method for preparing an alkaline corrugating adhesive having improved tack involves cooking in a continuous pressure cooker a starch derivative with a total amylose content of at least about 40% by weight and with a minimum D.S. of alkali-labile stabilizing groups of about 0.01, the cooking being conducted at a minimum temperature of about 80° C. to form a gelatinized starch carrier, and incorporating the carrier starch into an alkaline corrugating adhesive, which regenerates the amylose present in the starch. Preferably the total amylose content of the starch derivative is at least 65% and the D.S. is 0.035–0.30.

7 Claims, No Drawings

METHOD FOR PREPARING ALKALINE CORRUGATING ADHESIVE

BACKGROUND OF THE INVENTION

This invention relates to a method for preparing an alkaline corrugating adhesive. More particularly, this invention is directed to a method for preparation of an alkaline starch corrugating adhesive by continuous pressure cooking which adhesive has good tack properties.

The procedures employed in the production of corrugated board normally involve a continuous process wherein a strip of paperboard is first corrugated by means of heated, fluted rolls. An adhesive is applied to the protruding tips on one side of this corrugated strip, and a flat sheet of paperboard, referred to as a liner, is then brought into contact with these tips and, by application of heat and pressure, a bond is subsequently formed. The product thus prepared is known as a single-faced board inasmuch as it has a liner on only one surface thereof. However, by repeating the above-described bonding process on the exposed side of the corrugated strip of the single-faced board, there is then produced the so-called double-faced board comprising an inner corrugated layer sandwiched between two liners.

The particular adhesive employed in the corrugating process is selected on the basis of several factors, including the type of bond required in the final application of the finished corrugated product. Starch-based adhesives are most commonly used due to their desirable adhesive properties, low cost and ready availability.

The most fundamental of starch corrugating adhesives is that adhesive produced by gelatinizing starch in water with caustic soda to yield a primary mix of gelatinized carrier, which is then slowly added to a secondary mix of raw (ungelatinized) starch, borax, and water to produce the full-formulation adhesive, which is alkaline in character. In the corrugating process the adhesive is applied to the tips of the fluted paper medium, whereupon the heat causes the raw starch to swell and absorb water from the carrier starch. There are different theories regarding the respective roles of the raw starch and the carrier in the development of the adhesive properties, but there is substantial evidence to support the view that the carrier contributes to the bond strength and set speed of the adhesive, and that good tack in the carrier leads to better green bond strength (tack), and therefore improved runnability, in the full-formulation adhesive (see R. Williams, C. Leake, and M. Silano, TAPPI, Vol. 60, Nr. 4, April 1977, pp. 86-89).

Conventional batch methods are normally employed to cook carrier starches for use in corrugating adhesives. In such a procedure the starch is slurried in the cook tank, heated, e.g., to about 74° C., and held for ten minutes at that temperature. Batch size should be minimized to prevent overcooking and mechanical breakdown on holding.

Recently, continuous pressure cookers, commonly called jet cookers, have been developed to permit rapid cooking of starch, normally at temperatures of about 180°-360° F. (82°-182° C.), for use in various applications such as wet-end addition to paper, sizing, textile finishing and food stabilization. In the typical jet-cooking process, dry starch is slurried in water and pumped through a very small orifice to a cooking chamber (valve) of the cooking apparatus where it is immediately contacted by live steam such that intimate mixing occurs. In some installations water is provided to dilute the cold slurry prior to or after cooking. The heat of the steam gelatinizes the starch, and the mechanical shearing action of the expanding steam disrupts the swollen granules, all taking place in a matter of seconds. Advantages of continuous (jet) cooking over conventional batch cooking are that cooking conditions may be changed easily and promptly and that storage of cooked paste is minimal. The system enables the selection of a temperature and flow rate which will give the desired degree of swelling or dispersion.

Gelatinized carrier starches having good water resistance and tack are generally not prepared by continuous pressure cooking because the cooked starches which impart good water-resistance properties (i.e., unmodified and acid-converted high-amylose starches) retrograde during the operation, thereby preventing proper flow of the cooked starch into the raw portion of the adhesive, with consequent poor tack performance of the adhesive.

Accordingly, it is an object of the present invention to provide a method for preparing an alkaline starch corrugating adhesive with good tack from a high-amylose starch in a continuous pressure cooker.

SUMMARY OF THE INVENTION

The above and related objects are achieved in a method for preparing an alkaline corrugating adhesive which comprises, as a first step, providing a carrier starch by cooking in a continuous pressure cooker a granular starch derivative having a total amylose content of at least about 40% by weight and a degree of substitution of alkali-labile stabilizing groups of at least about 0.01, wherein said cooking is conducted at a temperature of at least about 80° C. for a period of time sufficient to disrupt totally the granular structure of the starch, and, as a second step, incorporating said carrier starch into an alkaline corrugating adhesive, such that the alkali-labile groups of said carrier starch are hydrolyzed in situ to regenerate the starch in unsubstituted form so as to provide sufficient tack in said adhesive.

Starch ester derivatives themselves have been used in alkaline corrugating adhesives (see U.K. Pat. No. 1,514,396 and Jap. Kokai Tokkyo Koho 79 72,238); however, such derivatives are not high-amylose starches and thus have relatively poor water resistance as compared to starch derivatives with a high amylose content of at least 40%.

The present invention enables the practitioner to prepare a carrier starch in a continuous pressure cooker from a high-amylose starch without the accompanying retrogradation problems encountered in the prior art. When incorporated into an alkaline corrugating formulation, the carrier starch prepared by the method herein is stable and regenerates the amylose to provide water resistance and bond strength (tack) properties in the adhesive.

DESCRIPTION OF THE PREFERRED EMBODIMENTS

The starch derivative to be employed in the preparation of the carrier starch herein must be a native granular starch, i.e., starch which has not been placed in an aqueous medium and heated or chemically modified to a point where the micellar network within the granules becomes so weakened as to allow further hydration and irreversible granular swelling. The practitioner will recognize that thin-boiling (fluidity) or crosslinked starch derivatives also fall within the scope of this invention.

It is preferred to employ high-amylose corn starch or 100% potato amylose starch herein, although any other starch containing at least 40% by weight amylose, and preferably at least 65% amylose, is also applicable to the invention. If the starch derivative contains less than 40% amylose it may still be jet-cooked, but it does not fall within the scope of this invention because without the high amylose content the starch will not have the water resistance and tack properties desirable in a carrier starch. Furthermore, since such starches will not retrograde in the jet-cooking process they do not present a problem to be solved by the present invention.

The starch derivative herein must have a degree of substitution (D.S.) of at least about 0.01, with the preferred D.S. ranging from 0.035 to 0.30. If the D.S. is much below this minimum, the starch will retrograde in the continuous cooking process because it will more closely approach the underivatized high-amylose starch.

The alkali-labile groups of the starch derivatives herein are stabilizing functional groups such as provided by ester or carbamate linkages which will hydrolyze to regenerate the free hydroxyl groups of the starch in an alkaline medium of pH greater than 7. These groups thus function to stabilize the amylose starch during jet-cooking but also to liberate the amylose when the carrier starch is incorporated into the full-formulation adhesive. The preferred starch derivative herein contains ester or mixed ester groups, which may be aromatic, aliphatic or cycloaliphatic ester groups. If the ester group is aliphatic, it preferably contains fewer than six carbon atoms, and is most preferably an acetyl group. Aliphatic ester groups with increasing carbon chain length (and thus increasing molecular weight) form fatty acids when hydrolyzed in situ in the alkaline medium, which, through the soap effect, tend to decrease the water resistance of the final adhesive.

The method for preparing the starch carrier herein involves cooking the starch derivative in a continuous pressure cooker as described above. The starch derivative is slurried in water up to 40% solids and is passed through a small pipeline to the cooking valve, where it comes in contact with live steam supplied at a typical pressure of about 80-100 psi (5.6-7 kg/cm$^2$). Intimate mixing of the steam and starch slurry occurs in the cooking valve, where the temperature to which the starch is subjected is at least 80° C., and preferably 82°-182° C. The cooking is carried out for a period of time sufficient to disrupt totally the granular structure of the starch, which cooking period is usually 1 to 20 minutes depending mainly on the pressure, temperature, type of starch and amount of amylose contained therein. The actual temperature employed will depend on such factors as, for example, the pressure utilized, the amylose content and the D.S. of the starch derivative. The starch may be diluted with predetermined amounts of water before and/or after cooking. These amounts are dependent on both the equipment and processing technique employed.

The continuous pressure cooker itself may be any such equipment as is known in the art to jet-cook a starch, such as the Continuous Starch Cooker Model C-80 supplied by National Starch and Chemical Corporation as described in their technical bulletin entitled "Continuous Cooking of Starch".

The carrier starch thus obtained can be incorporated directly into an alkaline corrugating adhesive, i.e., an adhesive which has a pH greater than 7 sufficient to hydrolyze the alkali-labile groups of the carrier starch in situ so that the amylose will be regenerated to provide the adhesive with tack and water resistance. The various techniques and the order for adding ingredients to form the full-formulation corrugating adhesive, which is generally comprised of raw starch, caustic soda (sodium hydroxide), borax ($Na_2B_4O_7$) and carrier starch, are well known in the art, as described, for example, in U.S. Pat. Nos. 2,102,937 and 2,051,025 to Bauer.

The following examples will illustrate more fully the embodiments of the invention. In all examples, parts and percentages are expressed by weight and temperatures in degrees Centigrade, unless otherwise noted.

The test procedures employed herein to evaluate the carrier starch and the corrugating adhesive resulting therefrom are given below:

Tack Test For Carrier Starch

A starch solution containing 9.88 parts of the jet-cooked high-amylose starch derivative, 0.79 parts sodium hydroxide and 0.79 parts borax (containing 10 moles water per mole borax) is applied to a sheet of paper of 23 kg/ream wet strength bag stock by means of a 8.9-cm-wide Bird applicator. The starch film thus obtained is 0.008 cm thick and 5 cm wide. A second sheet of the same quality paper is then pressed to the adhesive-coated surface using a 7.2 kg roller. The tensile strength of the adhesive is then immediately tested using a Thwing-Albert Intelect 500 Tensile Tester (trademark) having been programmed to have a 2.5 cm gauge length factor with sensitivity of 99, a 25 cm-per-minute head speed, a 990.0% elongation, and a 1000 gram load cell. The results are recorded for peak load (measured in grams and designated LD) and for total energy absorbed (measured in gram-cm and designated TEA). Higher values indicate greater degrees of cohesiveness (tack).

Water Resistance Test For Total Adhesive

The water resistance of the total corrugating adhesive is measured both with and without the presence of 6% of a water-resistant ketoneformaldehyde resin (sold under the trademark DACREZ 78) in the adhesive.

In both cases the adhesives are applied to a wet strength bag stock paper of 23 kg/ream via a 8.9 cm Bird applicator which delivers a wet film of 5 cm in width and 0.008 cm in thickness. A second sheet of bag stock paper is then pressed to the adhesive-coated sheet which is placed on a 177° C. hot plate and covered by a 4.5 kg weight for a period of 15 seconds to cure the adhesive and set the bond. Strips which are 2.5 cm wide are cut across the adhered sheets, and each strip is evaluated for water resistance.

When no resin is added, the strips are soaked in water for 10 and 20 minute periods and separated on the Thwing-Albert Intelect 500 Tensile Tester. The Tester is programmed for the same conditions as mentioned above in the Tack Test except that the elongation is 350.0% rather than 990.0%. The results of the test are recorded as peak load (LD) in grams and as total energy absorbed (TEA) in gram-cm.

When the resin is added to the corrugating adhesive, the strips are soaked in water for 24 hours before being separated on an Instron Tensile Tester. The conditions of separation are the same as above except that a 450 gram load cell is employed rather than a 1000 gram load cell. The chart speed is 5 cm per minute. The results of this test are recorded as the average load values in grams.

EXAMPLE I

This example illustrates the stabilizing effect of the ester group on the viscosity of high-amylose corn starch upon jet cooking thereof.

A high-amylose starch acetate derivative of D.S. 0.039 was prepared by slurrying 100 parts of a high-amylose corn starch (containing 70–80% amylose by weight) in 150 parts water. The pH of the slurry was adjusted to 8, and about 3.0 parts of acetic anhydride were thereafter slowly added to the slurry while maintaining the pH at 8 by addition of dilute sodium hydroxide solution. After complete addition of acetic anhydride the pH of the slurry was adjusted to 6.5, and the slurry was filtered, washed and dried.

The underivatized high-amylose corn starch (as control) and the starch acetate derivative were passed through a continuous pressure cooker at a temperature of 154°–177° C. under high pressure so as to disrupt totally the starch granules. The viscosity stability of each cooked starch was measured at 19.2% solids at 39° C. using a Brookfied Viscometer (model RVF) with spindle #4 at 100 rpm. The results are given in Table I.

TABLE I

| | Brookfield Viscosity (cps) | |
|---|---|---|
| Time (hours) | Underivatized High-Amylose Corn Starch (control) | High-Amylose Corn Starch Acetate |
| 0 | 796 | 984 |
| 1 | 10,500 | 1000 |
| 2 | 18,000 | 1040 |
| 4 | 23,000 | 1048 |
| 6 | * | 1042 |
| 22 | * | 1046 |

*Too thick to be measured.

It can be seen from the viscosity data that the starch derivative herein did not retrograde upon being cooked under the conditions present in the continuous pressure cooking operation as did the underivatized starch, and thus represents a jet-cooked carrier starch of superior stability.

When the amount of acetic anhydride was reduced to one part such that a high-amylose corn starch acetate of D.S. 0.013 was produced, the starch derivative retrograded slowly upon cooking in the continuous pressure cooker under the same conditions. If the D.S. is below about 0.01 the retrogradation is much more pronounced so that the instable starch produced is not within the scope of this invention.

EXAMPLE II

Two starch derivatives were prepared by the procedure of Example I except that 4.06 parts of acetic anhydride (for the starch acetate) or 3 parts of succinic anhydride (for the starch succinate) were added instead of 3.0 parts of acetic anhydride. The starch acetate had a D.S. of 0.062 and the starch succinate a D.S. of 0.038. Each derivative was cooked as described in Example I and tested, along with the unmodified high-amylose starch, for tack performance. The results are given in Table II.

TABLE II

| | Tack | |
|---|---|---|
| Starch | LD (g) | TEA (g-cm) |
| Underivatized High-Amylose Corn Starch (Control) | 54 | 67,600 |
| Starch Acetate | 77 | 112,300 |
| Starch Succinate | 86 | 118,100 |

The lower tack values of the unmodified starch are due to the retrogradation of the amylose during the continuous cooking operation. From the improved tack values of the starch derivatives it is seen that the retrogradation is significantly decreased upon derivatization of the starch.

EXAMPLE III

This example shows the effect of derivatization on the water resistance of the full-formulation corrugating adhesive.

Three corrugating adhesives were prepared by blending each of the three cooked starch solutions of Example II as the adhesive carrier with a raw starch slurry containing water, unmodified corn starch, sodium hydroxide and borax (containing 10 moles water per mole borax). The final proportion of the ingredients was as follows:

| Ingredients | % |
|---|---|
| Water | 68.2 |
| Starch Carrier | 6.8 |
| Sodium hydroxide* | 0.55 |
| Borax | 0.55 |
| Unmodified Corn Starch | 23.9 |

*For the starch derivatives extra sodium hydroxide was added equivalent to the degree of substitution on starch.

Each formulation was tested for water resistance as described above and the results are given in Table III.

TABLE III

| | Water Resistance | | | | |
|---|---|---|---|---|---|
| | Without DACREZ 78 | | | | With |
| | LD (g) | | TEA (g-cm) | | DACREZ |
| Starch | 10 min. | 20 min. | 10 min. | 20 min. | 78 (g) |
| Underivatized High-Amylose Corn Starch (control) | 208 | 141 | 144,500 | 102,600 | 110 |
| Starch Acetate | F-T* | 143 | F-T* | 107,200 | F-T* |
| Starch Succinate | 118 | 85 | 64,000 | 51,800 | — |

*F-T means fiber tear in which the bonding was too strong to be measurable under the set conditions.

The results indicate that the starch acetate is considerably superior in performance to both the unmodified starch and the starch succinate. The lower water resistance for the starch succinate is attributable to the soap effect of higher-chain esters which hydrolyze in the alkaline medium. The starch acetate is most preferred when water resistance is an important property in the corrugating adhesive.

EXAMPLE IV

This example illustrates use of a starch derivative having a lower amylose content.

A starch acetate derivative of D.S. 0.30, prepared as in Example I using a higher amount of acetic anhydride and a high-amylose corn starch containing about 45–55% amylose, was cooked in a continuous pressure cooker at 82° C. Borax and sodium hydroxide were then added such that the final dispersion had 88.54 parts water, 9.88 parts starch acetate, 0.79 parts borax (10 moles water per mole borax) and 0.79 parts sodium hydroxide. The cooked starch dispersion had a Brookfield viscosity at 20 rpm of 258 cps, measured with #4 spindle, and remained stable for at least two hours. The tack of the dispersion and the water resistance of the total adhesive having the same amounts of components as in Example III are indicated in Table IV.

TABLE IV

| Tack | | Water Resistance | | | | |
|---|---|---|---|---|---|---|
| | | Without DACREZ 78 | | | | With |
| | TEA | LD (g) | | TEA (g-cm) | | DACREZ |
| LD (g) | (g-cm) | 10 min. | 20 min. | 10 min. | 20 min. | 78 (g) |
| 28 | 31,800 | 149 | 101 | 104,600 | 73,200 | 41 |

The underivatized high-amylose corn starch of 45–55% amylose retained its granular form and could not be cooked in the continuous pressure cooker at the same temperature. Thus, tack and water resistance measurements could not be made for comparison purposes.

EXAMPLE V

This example illustrates use of a 100% potato amylose starch derivative as the starch carrier herein.

Two carrier starches were prepared by cooking, at 19.34% solids in a continuous pressure cooker at 177° C., a 100% potato amylose starch (as control) and a starch acetate prepared therefrom by the procedure of Example I (D.S. 0.043). The appearance of each carrier was noted and is indicated in Table V. These carrier starches were then transferred into the raw starch portion to obtain two full-formulation adhesives consisting of 73.28 parts water, 4.55 parts carrier, 0.48 parts sodium hydroxide, 0.48 parts borax (containing 10 moles water per mole borax) and 21.21 parts raw corn starch. The Stein-Hall viscosities of each adhesive were measured and are given in Table V.

TABLE V

| Starch | Appearance of Carrier Starch After Cooking | Stein-Hall Viscosity of Adhesive (sec) |
|---|---|---|
| Underivatized 100% Potato Amylose Starch | Cloudy, opaque, indicating immediate retrogradation after cooking | too heavy to be measured - thickened |

TABLE V-continued

| Starch | Appearance of Carrier Starch After Cooking | Stein-Hall Viscosity of Adhesive (sec) |
|---|---|---|
| (control) 100% Potato Amylose Starch Acetate | Clear appearance and stable viscosity | continuously 53.0 (viscosity remained stable for at least two hours) |

The results indicate the improved effect of the present starch derivative on viscosity and stability as compared with the control.

In summary, it is seen that the present invention provides a method for the preparation of an alkaline corrugating adhesive in a continuous pressure cooker wherein a high amylose starch is utilized and the adhesive possesses good tack.

Now that the preferred embodiments of the present invention have been described in detail, various modifications and improvements thereon will become readily apparent to the practitioner. Therefore, the spirit and scope of the invention are to be limited only by the appended claims, and not by the foregoing specification.

What is claimed is:

1. A method for preparing an alkaline corrugating adhesive which comprises, as a first step, providing a carrier starch by cooking in a continuous pressure cooker an aqueous slurry of a granular starch derivative having a total amylose content of at least about 40% by weight and a degree of substitution of alkali-labile stabilizing groups of at least about 0.01, wherein said cooking is conducted at a temperature of at least about 80° C. for a period of time sufficient to disrupt totally the granular structure of the starch, and, as a second step, incorporating said carrier starch into an alkaline corrugating adhesive, such that the alkali-labile groups of said carrier starch are hydrolyzed in situ to regenerate the starch in unsubstituted form so as to provide sufficient tack in said adhesive.

2. The method of claim 1 wherein said starch has an amylose content of at least 65% by weight.

3. The method of claim 1 wherein said starch is a high-amylose corn starch or 100% potato amylose starch.

4. The method of claim 1 wherein said alkali-labile groups are ester groups.

5. The method of claim 4 wherein said ester groups are acetyl groups.

6. The method of claim 1 wherein said starch derivative is cooked in the first step at a temperature of 82°–182° C.

7. The method of claim 1 wherein said starch derivative has a degree of substitution of 0.035–0.30.

* * * * *